(12) United States Patent
Soyris

(10) Patent No.: US 7,380,380 B2
(45) Date of Patent: Jun. 3, 2008

(54) THERMAL PROTECTION DEVICE

(75) Inventor: Philippe Soyris, Bordeaux (FR)

(73) Assignee: Snecma Propulsion Solide, Le Haillan (FR)

( * ) Notice: Subject to any disclaimer, the term of this patent is extended or adjusted under 35 U.S.C. 154(b) by 729 days.

(21) Appl. No.: 10/260,726

(22) Filed: Sep. 30, 2002

(65) Prior Publication Data

US 2004/0027764 A1     Feb. 12, 2004

(30) Foreign Application Priority Data

Jul. 22, 2002  (FR)  ................................. 02 09260

(51) Int. Cl.
*E04B 1/74*    (2006.01)
(52) U.S. Cl. ................. 52/404.1; 52/407.2; 52/506.02; 52/404.3
(58) Field of Classification Search .................. 52/404, 52/405, 506, 513, 805, 809, 407.2, 404.3, 52/404.5, 506.02, 506.05, 404.1; 244/158, 244/117, 121, 156
See application file for complete search history.

(56) References Cited

U.S. PATENT DOCUMENTS

| | | | |
|---|---|---|---|
| 3,894,372 A | * | 7/1975 | Robert et al. .......... 220/560.06 |
| 4,012,879 A | | 3/1977 | Aubert et al. .................. 52/508 |
| 4,456,208 A | * | 6/1984 | MacConochie et al. . 244/158 A |
| 5,216,886 A | * | 6/1993 | Ewing ........................... 60/752 |
| 5,219,648 A | * | 6/1993 | Morimoto et al. ........ 428/316.6 |
| 5,560,569 A | * | 10/1996 | Schmidt .................. 244/117 R |
| 6,293,496 B1 | | 9/2001 | Moe ........................... 244/120 |

FOREIGN PATENT DOCUMENTS

| | | |
|---|---|---|
| FR | WO 01 03916 A | 1/2001 |
| JP | 10 226400 | 11/1998 |

* cited by examiner

*Primary Examiner*—Basil Katcheves
(74) *Attorney, Agent, or Firm*—Weingarten, Schurgin, Gagnebin & Lebovici LLP

(57) ABSTRACT

The invention provides a thermal protection device for mounting on the wall of a structure to be protected, the device comprising a panel suitable for receiving high temperature heat flux on its outside face. The panel is held at a determined distance from the wall of the structure and beside its inside face there is at least one thermally insulating layer. The thermal protection device further comprises a layer made of a compressible material which is maintained in a compacted state between the wall of the structure and the thermally insulating layer. The thermally insulating layer can thus be held reliably as close as possible to the panel without generating heat conduction paths or large mechanical stresses on the panel.

6 Claims, 3 Drawing Sheets

THERMAL PROTECTION DEVICE

FIELD OF THE INVENTION

The present invention relates to the field of thermal protection and more particularly to holding insulation in place inside thermal protection.

PRIOR ART

Thermal protection devices such as those present on vehicles for reentering the atmosphere, for example, are generally in the form of panels which act not only to provide mechanical strength to the outside wall of the vehicle, but also to provide thermal insulation.

Nevertheless, recent projects have shown that there can be advantages in dissociating the outside wall function from the thermal insulation function. Under such circumstances, the thermal protection device can comprise a panel of thermostructural composite material constituting the outside wall of the device together with internal insulation disposed between the inside face of the panel and the wall of the structure to be protected. This internal insulation is made using lightweight materials, such as insulating wool, for example.

In certain cases, for example when the height required for the insulation is smaller than the height required for the panels and their attachment systems, a panel receiving high temperature heat flux is relatively far away from the wall of the structure to be protected. Such separation is also required when the separation needs to be kept constant even though the thickness of the insulation can vary, as can apply when a cold structure is designed independently of the thermal protection, or with a cryogenic tank where it can be necessary to provide for flows between the elements.

Thus, the insulating layer for providing the required temperature gradient between the panel and the structure to be protected does not fill the entire space between them. In addition, in order to reduce radiation on the elements that lie between the two structures (for example panel fastenings, electronic components, etc.), it is necessary for the insulating layer to be held against or as close as possible to the panel on the hot side.

Numerous solutions are in existence for holding the insulating layer. Nevertheless, those solutions present drawbacks. For example, adhesive holding the insulation layer to the panel is poor at withstanding the extreme temperatures that are encountered on the hot faces of thermostructural panels, which temperatures can be as high as 1800° C., whereas conventional adhesives are capable of withstanding temperatures only up to about 1400° C.

Various types of mechanical fixing have also been envisaged for securing the insulating layer to the panel, but as with adhesive, temperatures are too high. In addition, a mechanical fastener would need to pass right through the insulating layer which would degrade its insulating performance by creating a conduction path through the insulation.

Another solution consists in pressing the insulating layer against the panel by means of supporting straps or netting. The dimensions of the panels and the mass of the insulating layer run the risk of excessive amounts of sag occurring in the middles of the panels.

OBJECT AND BRIEF SUMMARY OF THE INVENTION

The present invention seeks to remedy the above-mentioned drawbacks and to provide a thermal protection device in which the thermally insulating layer is held adjacent to the panel without giving rise to heat conduction paths or to large mechanical stresses on the panel.

These objects are achieved by a thermal protection device for mounting on the wall of a structure to be protected, said device comprising a panel suitable for receiving high temperature heat flux and large mechanical loads on its outside face, said panel being held at a determined distance from the wall of the structure and having at least one thermally insulating layer beside its inside face, the thermal protection device further comprising a layer made of a compressible material that is maintained in the compacted state between the wall of the structure and the thermally insulating layer.

Thus, the thermally insulating layer can be held reliably as close as possible to the panel without generating heat conduction paths or large mechanical stresses on the panel.

Preferably, the layer of compressible material presents a Young's modulus in compression that is smaller than that of the thermally insulating layer.

In a particular aspect of the invention, the layer of compressible material is made of a compactable foam, which may be constituted by a material that is not flammable.

According to a particular characteristic of the invention, the layer of compressible material presents thermal insulation characteristics. Openings may be provided between the recesses in order to form a circulation path for a cooling flow within the thermal protection device.

According to another characteristic of the invention, the thermally insulating layer comprises a plurality of insulating layers made of different thermally insulating materials.

The thermal protection device may further comprise stiffeners placed between the panel and the thermally insulating layer, or else which penetrate part of the way into the thermally insulating layer from the inside surface of the panel.

BRIEF DESCRIPTION OF THE DRAWINGS

Other characteristics and advantages of the invention will appear from the following description of particular embodiments of the invention given as non-limiting examples and made with reference to the accompanying drawings, in which.

DETAILED DESCRIPTION OF EMBODIMENTS OF THE INVENTION

The solution proposed by the present invention consists in applying a compression force on the layer(s) of insulation in order to hold the insulation against or close to the panel. This force is supplied by a layer of compressible material which is placed in a compacted state in the space available between the wall of the structure to be protected and the insulating layer(s). Consequently, the invention is applicable to any thermal protection device in which the insulating layer takes up less space than the space available between the panel and the wall of the structure to be protected.

Figure 1A:
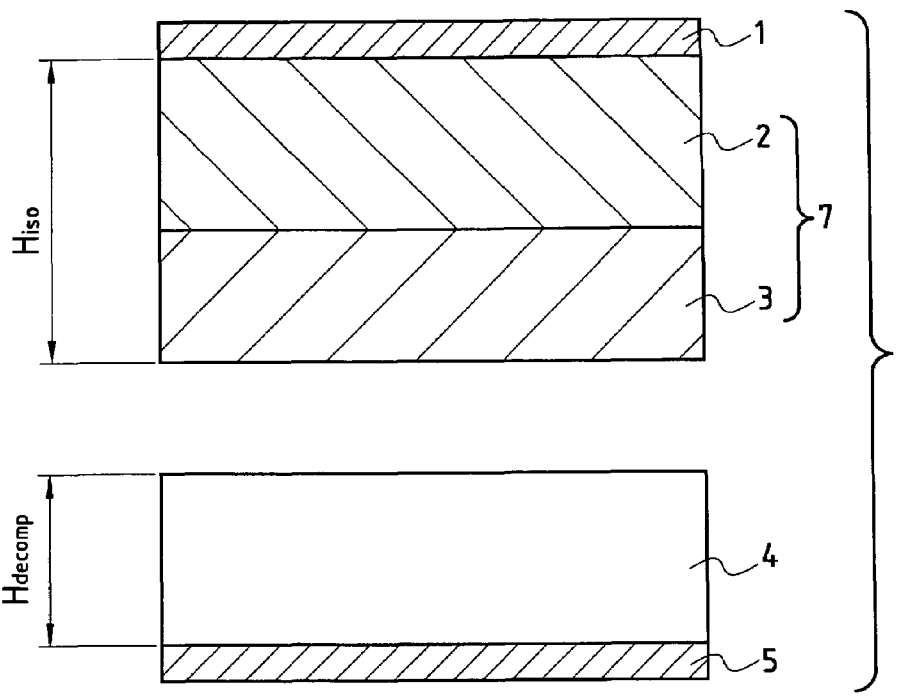
FIG. 1A is a section view of one embodiment of the thermal protection device of the invention prior to being assembled.
Figure 1B:
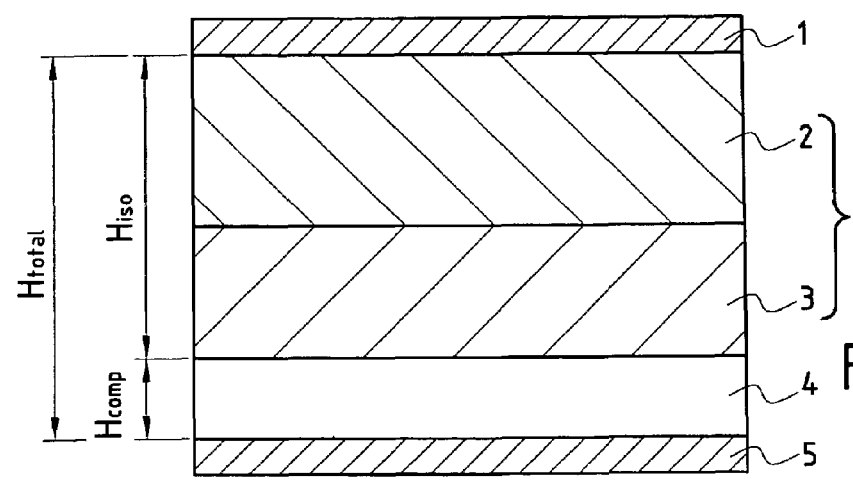
FIG. 1B is a section view of a thermal protection device constituting a first embodiment of the invention and shown after assembly.

FIGS. 1A and 1B show a first example of how a thermal protection device of the invention can be assembled. The function of such a device is to protect a structure such as a vehicle for reentering the atmosphere or a cryogenic tank against high temperature heat fluxes as encountered in their operating environment. For this purpose, the thermal protection device firstly comprises a panel 1 whose outside face receives the high temperature heat flux. The panel 1 performs several functions: it provides strength against mechanical loading (differences between inside and outside pressures, structural deformation, . . . ); it performs a function of defining outside shape (an aerodynamic shape); it performs a function of protecting the insulation against the outside environment (abrasion, fast flows, rain, hail, plasma, . . . ); and it performs a reflective screen function.

The panel 1 may be made out of a thermostructural composite material such as carbon-carbon, carbon-SiC, a material having an oxide matrix, or the like. Given the temperature levels to which the panel is subjected (around 1600° C. to 1800° C.), it is important for the panel to be far enough away from the wall 5 of the structure that is to be protected. In addition, in order to establish a temperature gradient between the panel 1 and the wall 5, a layer of thermal insulation 7 is disposed between these two elements. In the embodiment shown in FIGS. 1A and 1B, the insulating layer 7 comprises, by way of example, two sub-layers 2 and 3 of lightweight insulating materials such as insulating wool. Depending on circumstances, it can be advantageous to use a plurality of insulating layers, each being constituted by a different insulating material presenting increased insulating capacity for a specific temperature range. Thus, in order to obtain an insulating layer which presents optimum insulating capacity, the layer may comprise a succession of layers each constituted by a particular insulating material adapted to the temperature range encountered where it is located.

The thermal insulating layer may alternatively comprise a single-layer structure.

In accordance with the invention and as shown in FIG. 1A, a layer 4 constituted by a compressible material is placed on the wall 5 prior to assembling the panel 1 and the insulating layer 7 thereon. Before assembly, the thickness of the insulating layer 7 is $H_{iso}$ and the layer of compressible material at rest presents a thickness $H_{decomp}$. Once the thermal protection device has been assembled on the wall 5 of the structure to be protected, the panel 1, the insulating layer 7, and the layer of compressible material 4 present a total thickness $H_{total}$ which is less than the sum of the thickness $H_{iso}$ of the layer 7 plus the thickness $H_{decomp}$ of the layer 4 prior to assembly. This difference in thickness is compensated by a decrease in the volume of the compressed layer 4 after assembly. In other words, the layer of compressible material 4 is selected to have a thickness $H_{comp}$ which is greater than the thickness left empty between the insulating layer 7 and the wall 5 after assembly. Thus, a compressive force is applied to the layer 7 serving to hold it in contact with the panel 1 without any need to resort to an adhesive or to a mechanical fixing system.

The layer 4 may comprise any type of material suitable for being compressed or compacted, and preferably comprises a material presenting a Young's modulus in compression that is smaller than that of the material(s) constituting the insulating layer 7. In order to ensure that the entire thermal protection device holds together, the insulating layer 7 and the layer of compressible material 4 become compressed as a function of their Young's moduluses. If the layer 4 is implemented using a packing material having a Young's modulus that is large compared with that of the layer 7 (i.e. a material that is not very compressible), then the compression force applied to the assembly would merely deform the insulating layer 7 and that would reduce its thermal resistance characteristics. It is therefore preferable for the layer 4 to be made of a material which is selected to absorb the major part of the deformation that takes place during assembly in order to guarantee that the properties of the insulating layer are maintained.

In one embodiment of the invention, the layer 4 is made of a foam having low density, a certain amount of resistance to compression, the ability to be shaped easily in three dimensions, and good resistance to temperatures of at least 200° C. Numerous commercially available foams satisfy these requirements and can be used in the present invention. Nevertheless, it is preferable for such a foam to be nonflammable. By way of example, mention can be made of V3012 "BASOTECT"® foam which is entirely suitable for use in the invention. The layer 4 made in this way and held in a compacted state in the thermal protection device of the invention serves to generate the compression force between the wall 5 and the insulating layer 7, thus serving to hold the insulating layer against the panel 1.

Figure 2:
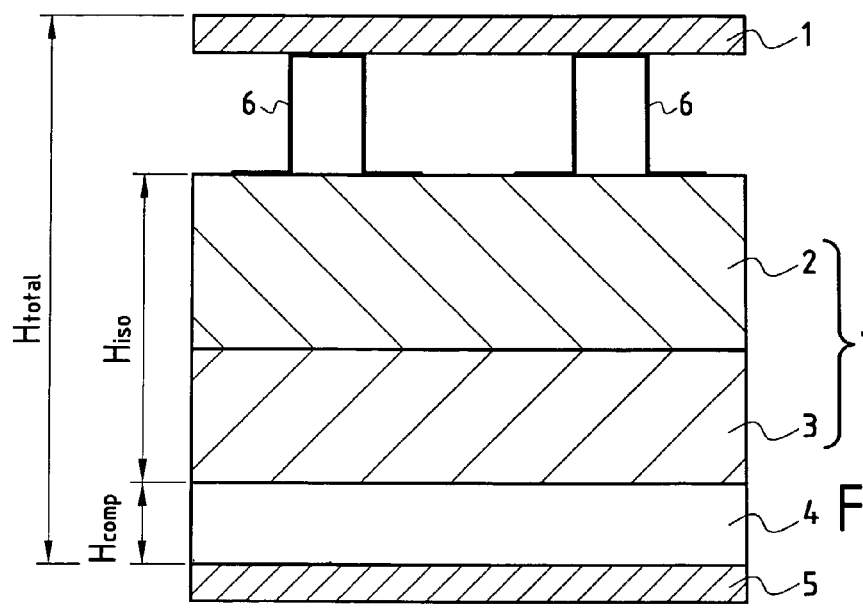
FIG. 2 is a section view of a thermal protection device constituting a second embodiment of the invention.

FIG. 2 shows a second embodiment of the thermal protection device of the invention. The difference between the device shown in FIG. 2 and that shown in FIGS. 1A and 1B lies in stiffeners 6 being added between the panel 1 and the insulating layer 7. In certain applications, the panel 1 needs to be provided with stiffeners 6 in order to improve its mechanical strength. Under such circumstances, the insulating layer 7 is no longer directly in contact with the panel 1 but comes into contact with the stiffeners 6. The layer of compressible material 4 then applies a compression force for holding the layer 7 as close as possible to the panel 1, i.e. in contact with the stiffeners 6.

Figure 3:
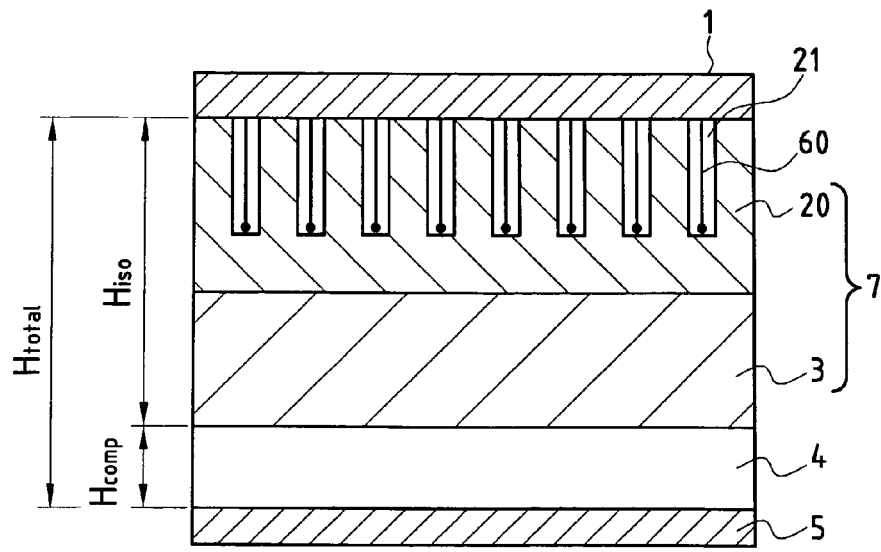
FIG. 3 is a section view of a thermal protection device constituting a third embodiment of the invention.

FIG. 3 shows a third embodiment in which the panel is likewise provided with stiffeners 60. Unlike the stiffeners 6 of FIG. 2, the stiffeners 60 are of a shape suitable for being received in cutouts 21 formed in a first insulating layer 20. In this case, the insulating layer 20 is held by the layer of compressible material 4 in direct contact with the panel 1, with the exception of the cutouts 21.

The shapes of the stiffeners 6 and 60 shown in FIGS. 2 and 3 respectively are arbitrary. Depending on the desired effects, the stiffeners may have other shapes.

Figure 4:
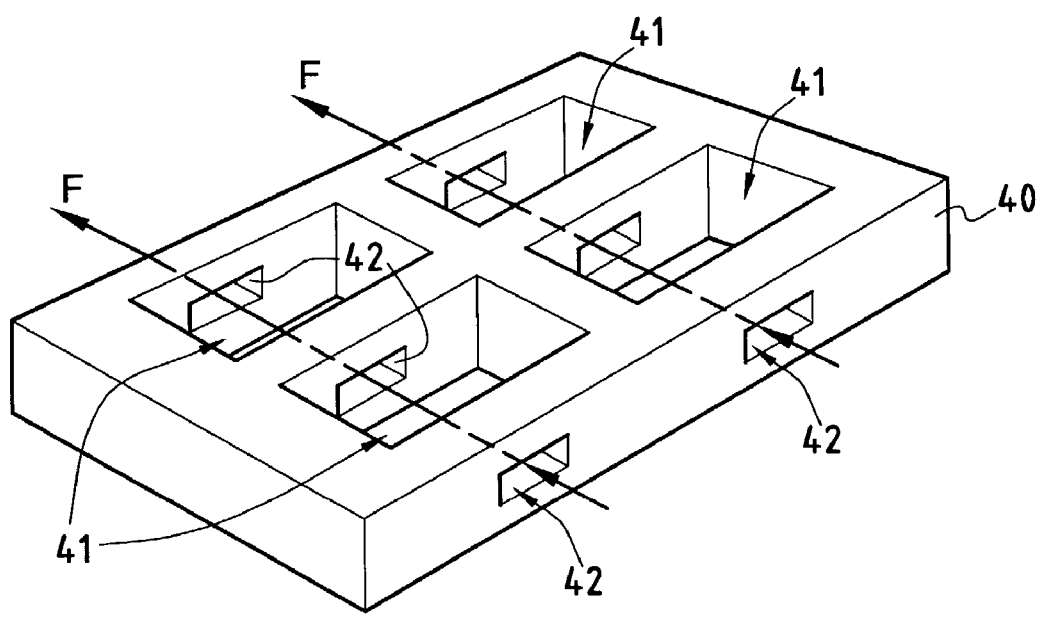
FIG. 4 is a perspective view of a holding layer in accordance with the invention.

The layer of compressible material may be formed as a single block of foam or the like, or else it may be shaped depending on requirements. FIG. 4 shows one possible shape for a block of foam suitable for use in the device of the invention. In FIG. 4, the block 40 has outside dimensions adapted to those of the layer of insulation that is to be held, and it also has a series of recesses 41. These recesses can be made in order to reduce the mass of the layer 4 by reducing its filling fraction. If the shape and disposition of the recesses is suitably chosen, as shown in FIG. 4, it is possible to obtain a filling fraction that is well below 1, e.g. ⅓ or ½, without spoiling the compression force applied to the insulating layer. The recesses 41 can also be used for providing spaces for housing electronic components or stiffeners placed on the wall 5 of the structure to be protected. In addition, openings 42 can be made so as to provide a circulation path for a cooling flow F through the thermal protection device.

By means of the present invention, the insulating layer is held in place solely by deforming the layer of compressible material. There is no need for any fasteners which could form conduction paths through the layer of insulation. By its very nature, compressible material is tolerant of the imperfections of shape that might appear in the insulating layer. In addition, since the compressible layer is placed against the cold structure, it does not need to be made of a material that is specially selected for its high temperature characteristics. Consequently, the solution proposed by the present invention also has the advantage of low cost.

Nevertheless, in some cases it may be advantageous for the compressible material to present good thermal insulating characteristics. If the compressible material contributes to insulating the structure, then the thickness of the insulating layer 7 can be reduced, thereby reducing the mass of the assembly. This solution can be advantageous in the space industry, for example, where mass reduction is a perpetual goal.

The invention claimed is:

1. A thermal protection device for mounting on the wall of a structure to be protected, said device comprising:
    a panel comprised of a thermostructural fiber composite material and having an inside face and an outside face, said panel suitable for receiving high temperature heat flux and large mechanical loads on its outside face, said panel being held at a determined distance from the wall of the structure;
    at least one thermally insulating layer comprised of a thermally insulating material, having an inner face and an outer face, the outer face disposed facing and in thermal communication with the inside face of the panel;
    a compressible layer having an inner face and an outer face made of a compressible resilient material that is maintained in a compacted state between the wall of the structure and the thermally insulating layer, the compressible resilient material comprised of a block of flexible, low-density foam, resistant to a temperature of at least 200° C., and having a Young's modulus in compression that is smaller than that of the thermally insulating layer;
    wherein the compressible layer of compressible resilient material includes recesses formed therein in at least one of the inner face and the outer face; and
    wherein the compressible layer of compressible resilient material further comprises openings formed between the recesses to form a circulation path generally parallel to the inner face and the outer face and extending to at least one recess for a cooling flow within the thermal protection device.

2. A thermal protection device according to claim 1, wherein the foam is made of a material that is not flammable.

3. A thermal protection device according to claim 1, wherein the layer of compressible material presents thermal insulation characteristics.

4. A thermal protection device according to claim 1, wherein the thermally insulating layer comprises a plurality of insulating layers made of different thermally insulating materials.

5. A thermal protection device according to claim 1, further comprising stiffeners placed between the panel and the thermally insulating layer.

6. A thermal protection device according to claim 1, further comprising stiffeners which penetrate part of the way into the thermally insulating layer from the inside surface of the panel.

\* \* \* \* \*